(12) United States Patent
Hemmert et al.

(10) Patent No.: US 9,144,862 B2
(45) Date of Patent: Sep. 29, 2015

(54) SYSTEM AND METHOD FOR DETERMINING WELDING WIRE DIAMETER

(71) Applicant: Illinois Tool Works Inc., Glenview, IL (US)

(72) Inventors: Bradley William Hemmert, Neenah, WI (US); Mark Steven Kadlec, Shiocton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 139 days.

(21) Appl. No.: 13/690,641

(22) Filed: Nov. 30, 2012

(65) Prior Publication Data

US 2014/0151350 A1 Jun. 5, 2014

(51) Int. Cl.
*B23K 9/095* (2006.01)
*B23K 35/00* (2006.01)
*B23K 9/133* (2006.01)

(52) U.S. Cl.
CPC ............... *B23K 35/00* (2013.01); *B23K 9/0956* (2013.01); *B23K 9/1336* (2013.01)

(58) Field of Classification Search
CPC .... B23K 9/095; B23K 9/0953; B23K 9/0956; B23K 11/25; B23K 11/251; B23K 11/252; B23K 11/253; B23K 11/255; B23K 11/256

USPC .......... 219/130.21, 130.5, 132, 137.7, 137.71
See application file for complete search history.

(56) References Cited

U.S. PATENT DOCUMENTS 6,091,048 A * 7/2000 Lanouette et al. ....... 219/130.21
2005/0161448 A1 7/2005 Stava

FOREIGN PATENT DOCUMENTS

WO 2013070546 5/2013

OTHER PUBLICATIONS

International Search Report from PCT application No. PCT/US2013/066906 dated Feb. 18, 2014, 12 pgs.
U.S. Appl. No. 13/491,259, filed Jun. 7, 2012, Bradley William Hemmert.

* cited by examiner

*Primary Examiner* — Brian Jennison
(74) *Attorney, Agent, or Firm* — Fletcher Yoder P.C.

(57) ABSTRACT

A welding system includes a welding wire feeder, a welding power supply, and a sensor. The power supply is coupled to the welding wire feeder and configured to produce a welding arc. The sensor is configured to sense a parameter indicative of a size of a welding wire fed through the welding wire feeder. The sensor is configured to send a signal to the power supply, the signal representing the parameter indicative of the size of the welding wire. The power supply is configured to automatically implement at least one of an arc starting parameter or a welding parameter based on the signal.

20 Claims, 5 Drawing Sheets

SYSTEM AND METHOD FOR DETERMINING WELDING WIRE DIAMETER

BACKGROUND

The invention relates generally to welding systems, and more particularly to systems and methods for determining a size of welding wire fed through a welding wire feeder.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, metal inert gas (MIG) welding typically relies on a wire feeder to ensure a proper wire feed reaches a welding torch. Such wire feeders facilitate the feeding of welding wire from a wire spool, through a pair of drive rolls, to the welding torch at a desired wire feed rate.

Many welding applications may be complex projects that often require different types of welds to be made, including welds made from different sizes and/or types of welding material (e.g., welding wire). In order to complete such a project, welding wire of one size may need to be swapped out for a welding wire of a different size. This may occur one of more times during a single welding operation or session. Generally, an operator must stop welding and manually change the welding wire. In addition, the operator may change the drive rolls of the wire feeder so that they are appropriate for the new welding wire.

For best performance, welding wire of a certain size generally requires a specific set of welding parameters such as arc starting parameters (e.g., amperage level). As such, when welding wire is changed, the operator often must return to the power source to manually change and/or set these parameters. Unfortunately, this can lead to a higher probability of operator error. For example, an operator may not be aware that arc starting parameters should be changed when changing the welding wire, and even a user who is aware may forget to do so. It may also be the case that the user does change the arc starting parameters, but changes them to an incorrect setting. This may result in a decrease in productivity and, in some instances, relatively poor weld quality.

BRIEF DESCRIPTION

In a first embodiment, a welding system includes a welding wire feeder, a power supply, and a sensor. The power supply is coupled to the welding wire feeder and configured to produce a welding arc. The sensor is configured to sense a parameter indicative of a size of a welding wire fed through the welding wire feeder. The sensor is configured to send a signal to the power supply, the signal representing the parameter indicative of the size of the welding wire. The power supply is configured to automatically implement at least one of an arc starting parameter or a welding parameter based on the signal.

In another embodiment, a welding system includes a welding wire feeder and a controller. The welding wire feeder includes a sensor configured to sense a parameter indicative of a size of a welding wire fed through the welding wire feeder and to output a signal representative of the sensed parameter. The controller is configured to receive the signal from the sensor, to convert the signal into a corresponding set of arc starting parameters, welding parameters, or both, and to implement the arc starting parameters, welding parameters, or both.

In a further embodiment, a method includes determining a sensor signal using a sensor associated with a welding wire feeder, wherein the sensor signal is indicative of a size of a welding wire used by the welding wire feeder. The method also includes communicating the sensor signal from the sensor to a controller disposed within a power supply. In addition, the method includes processing the sensor signal by translating the sensor signal into a corresponding set of arc starting parameters, welding parameters, or both. Further, the method includes implementing the corresponding set of arc starting parameters or welding parameters in the power supply, wherein the power supply is configured to produce an arc with the corresponding set of arc starting parameters, welding parameters, or both.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As described in greater detail below, provided herein are embodiments of welding systems including material sensing and control systems adapted to provide an indication of the size of a welding wire in a welding wire feeder in order to automatically change and/or set welding parameters such as arc starting parameters suited for the particular welding material size. For example, in one embodiment, a material sensing system may sense when a welding wire with a 0.035 inch diameter has been replaced by a welding wire with a 0.045 inch diameter in a welding wire feeder, and a control system may automatically adjust one or more arc starting parameters accordingly upon detection of the new size of welding wire.

For further example, in such an embodiment, the control system may alter an amperage setting of a welding power supply to produce less heat, as welding wire of one size may perform better at a lower temperature compared to welding wire of another size. Similarly, in some embodiments, the amperage may be increased or decreased, or other parameters may be altered in a suitable manner to provide ideal welding parameters for a specific welding wire size. In addition, such parameters may be altered for welding wires that are made from different materials but have the same diameter.

The automated selection and implementation of appropriate arc starting parameters frees an operator from having to manually set the correct arc starting parameters when changing welding wire sizes. As such, the welding system presented herein lowers the potential of having incorrect arc starting parameters when welding wire is changed, as the correct arc starting parameters are determined and set automatically. Additionally, the welding system presented herein may also be configured to automatically set, maintain, and adjust other operating or welding parameters during welding. The disclosed welding systems and methods may be used with many types of welding methods and equipment that use a welding wire feeder, including gas metal arc welding (GMAW). More specifically, the techniques described herein apply to welding systems that utilize a welding wire electrode that is fed progressively between drive rolls toward a welding application. These may include welding systems with standalone wire feeders, welding power supplies with integrated wire feeders, spool guns, and so forth. For brevity and illustrative purposes, only a sample of the embodiments of the disclosed welding system is included in the present disclosure.

Figure 1:
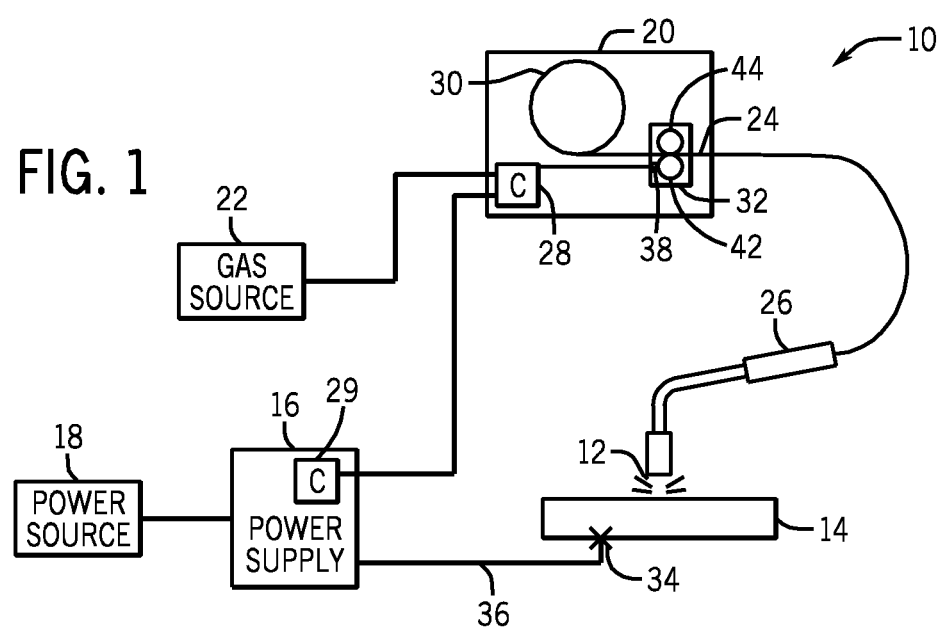
FIG. 1 is a block diagram of an embodiment of a welding system utilizing a wire feeder that may include a sensor for determining welding wire diameter.

Turning now to the figures, FIG. 1 is a block diagram of an embodiment of a welding system 10 in accordance with the present techniques. The welding system 10 is designed to produce a welding arc 12 on a work piece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding wire 24 is fed through the welding torch 26 to the welding arc 12, molten by the welding arc 12, and deposited on the work piece 14.

The wire feeder 20 will typically include control circuitry, illustrated generally by reference numeral 28, which regulates the feed of the welding wire 24 from a spool 30, and commands the output of the power supply 16, among other things. Similarly, the power supply 16 may include control circuitry 29 for controlling certain welding parameters and arc-starting parameters. The spool 30 will contain a length of welding wire 24 that is consumed during the welding operation. The welding wire 24 is advanced by a wire drive assembly 32, typically through the use of an electric motor under control of the control circuitry 28. In addition, the work piece 14 is coupled to the power supply 16 by a clamp 34 connected to a work cable 36 to complete an electrical circuit when the welding arc 12 is established between the welding torch 26 and the work piece 14.

Placement of the welding torch 26 at a location proximate to the work piece 14 allows electrical current, which is provided by the power supply 16 and routed to the welding torch 26, to arc from the welding torch 26 to the work piece 14. As described above, this arcing completes an electrical circuit that includes the power supply 16, the welding torch 26, the work piece 14, and the work cable 36. Particularly, in operation, electrical current passes from the power supply 16, to the welding torch 26, to the work piece 14, which is typically grounded back to the power supply 16. The arcing generates a relatively large amount of heat that causes part of the work piece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

In present embodiments, various arc starting or welding parameters may be set by sensing the configuration, size, and/or type of the welding wire 24 being used. Generally, one or more sensors 38 may be used to collect this data and communicate the data, in the form of a signal, to a material sensing and control system. The material sensing and control system is configured to receive such a signal from the sensor 38. The material sensing and control system may be located within the power supply 16 (e.g., control circuitry 29), or it may be located in the wire feeder (e.g., control circuitry 28). In certain embodiments, the sensor 38 may be integrated into the wire drive assembly 32 of the wire feeder 20. The wire drive assembly 32 facilitates progressive feeding of the welding wire 24 from the spool 30 to the welding torch 26 at a desired rate for the welding application. A feed motor (not shown) engages with two drive rolls 42 and 44 to push the welding wire 24 from the wire feeder 20 toward the welding torch 26. In practice, one of the drive rolls (e.g., 42) is mechanically coupled to the feed motor and is rotated by the feed motor to drive the welding wire 24 from the wire feeder 20. The mating drive roll (e.g., 44) is biased toward the welding wire 24 to maintain contact between the two drive rolls 42 and 44 and the welding wire 24. The illustrated embodiment shows one pair of drive rolls 42 and 44; however the wire feeder 20 may include multiple pairs of such drive rolls in certain embodiments. The sensor 38 may sense a parameter indicative of the size of the welding wire 24 by identifying one or more of the drive rolls 42 and 44 used to convey the welding wire 24 through the wire feeder 20. More specifically, the sensor 38 may sense a physical parameter, such as a depth of a counterbored section, of the identified drive roll, and send a signal indicative of the parameter to the control circuitry 28 and/or the control circuitry 29. The control circuitry may determine the size of the welding wire 24 based on the signal associated with the parameter of the identified drive roll.

Figure 2:
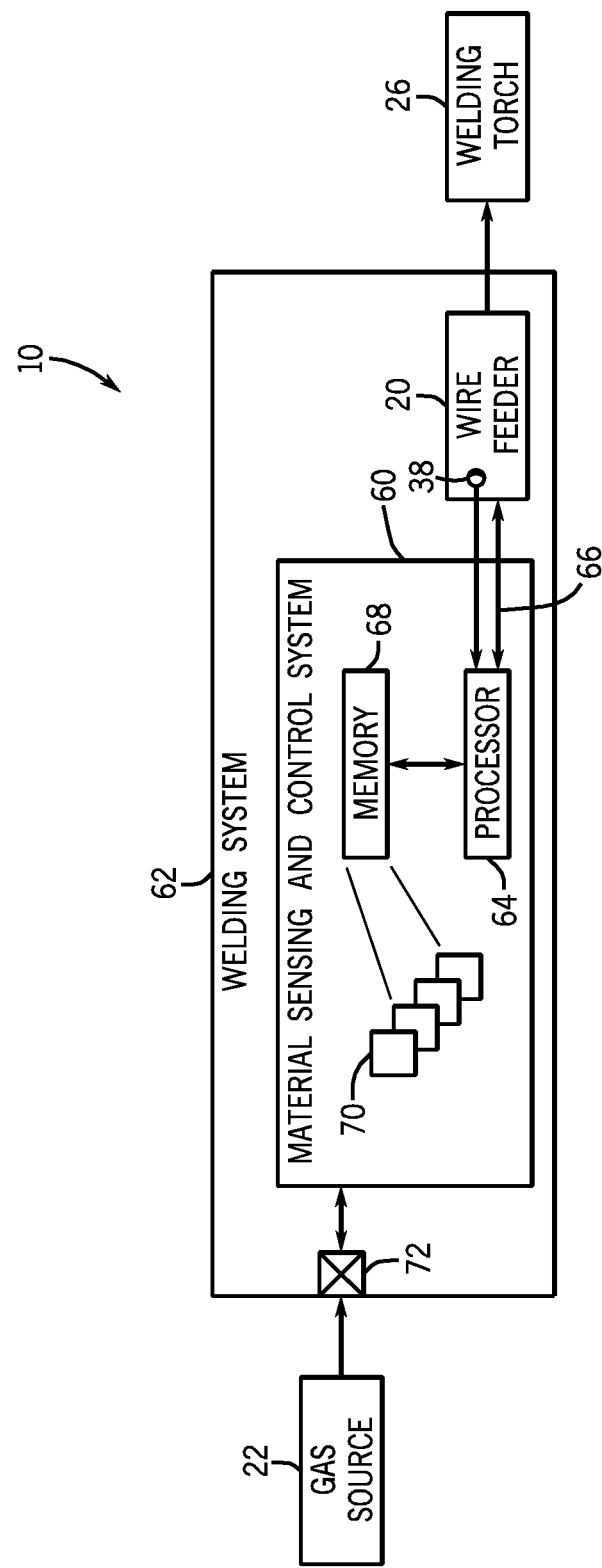
FIG. 2 is a block diagram of an embodiment of the welding system of FIG. 1, including a material sensing and control system.

Again, present embodiments of the welding system 10 may utilize a material sensing and control system to adjust certain arc starting or welding parameters based on a signal received from the sensor 38. FIG. 2 is a block diagram illustrating one such material sensing and control system 60, and how it interacts with components of the welding system 10. The material sensing and control system 60 includes control and processing circuitry configured to receive a plurality of inputs, including a sensor signal from the sensor 38. The material sensing and control system 60 may be configured to receive and process various data types, including voltage, image data, frequency, and so forth. At least one source of input may be the sensor signal received by the material sensing and control system 60 from the sensor 38. Upon receiving the sensor signal, the material sensing and control system 60 may translate the sensor signal into machine readable data, which becomes an input to machine executable instructions. Through execution of the instructions, the corresponding arc starting or welding parameters are determined, and the material sensing and control system 60 operates to automatically implement such parameters accordingly. As such, the material sensing and control system 60 is capable of automatically determining configuration, size and/or type information relating to the welding wire 24, and automatically (e.g., without user input) selecting and implementing welding parameters for the welding system 10.

The material sensing and control system 60 is included in a welding system 62 coupled to the welding torch 26. The welding system 62 may include the wire feeder 20 and the power supply 16 of FIG. 1. Likewise, and as described below, the material sensing and control system 60 may form a part of the control circuitry 29 of the power supply 16 and/or the control circuitry 28 of the wire feeder 20. In the illustrated embodiment, the material sensing and control system 60 is located entirely separate from the wire feeder 20. This may represent a system where the wire feeder 20 and the power supply 16 are separate, such that the material sensing and control system 60 is located in the power supply 16. In other embodiments, the wire feeder 20 may be integral with the power supply 16, such that the material sensing and control system 60 is resident in the wire feeder 20 as well.

The welding system 62 and/or the material sensing and control system 60 may further include a processor 64 which receives inputs such as sensor data from the sensor 38 in the wire feeder 20 via a communication cable 66. The processor 64 may also send control commands to a welding output portion of the welding system 62 in order to implement the correct welding parameters. Further, the processor 64 is generally coupled to a memory 68, which may include one or more software modules 70 that contain executable instructions, transient data, input/output correlation data, and so forth. The memory 68 may include volatile or non-volatile memory such as magnetic storage memory, optical storage memory, or a combination thereof. Furthermore, a variety of control parameters, including amperage or frequency of welding output, may be stored in the memory 68, along with machine readable and executable instructions (e.g., computer code) configured to provide a specific output relating to such parameters, given input sensor data. Generally, the processor 64 receives such sensor data from the sensor 38 in the wire feeder 20, references data stored in the memory 68 to find the welding parameters that correspond to the received sensor data, and implements the parameters.

As previously mentioned, the welding system 62 may also be coupled to the gas source 22, which provides shielding gas to the welding system 62. In certain embodiments, the gas source 22 may be configured to supply shielding gas, such as argon, helium, carbon dioxide, and so forth, to the welding torch 26 for use in the welding operation. In such embodiments, the gas may enter a gas valve 72 located in the welding system 62. The gas valve 72 may be configured to communicate with the material sensing and control system 60, such that the material sensing and control system 60 may also control the flow of gas to the welding torch 26. As such, the welding system 62 may also be configured to automatically change and/or set gas flow parameters based on the welding wire 24 that is sensed by the material sensing and control system 60. In a sense, then, gas flow parameters may also be considered arc starting and/or welding parameters.

It should be noted that, in other embodiments, the disclosed sensing and control processes may or may not all occur in the material sensing and control system 60. For instance, there may be one or more controllers (e.g., control circuitry 28 and 29) or processors that control different aspects of the welding system 62. In certain embodiments, a first system receives the sensor signal and is distinct from, but coupled to, a second system that processes the sensor signal, which may also be distinct from, but coupled to, a third system that implements the arc starting or welding parameters. In other embodiments, the same system may receive and process the sensor signal, while another system implements the arc starting and/or welding parameters. In further embodiments, multiple systems may implement different arc starting and/or welding parameters. For example, a first system (e.g., control circuitry 29) in the power supply 16 may receive, process, and translate the signal from the sensor 38 into arc starting and welding parameters. The first system may then implement certain parameters (e.g., voltage/hot start) via the power supply 16. In addition, the first system may send other parameters (e.g., welding wire feed speed) to another system (e.g., control circuitry 28) in the wire feeder 20 for implementation.

As illustrated in FIG. 2, the material sensing and control system 60 may be provided as an integral part of the welding system 62 in some embodiments. That is, the material sensing and control system 60 may be integrated into the welding system 62, for example, during manufacturing of the welding system 62. Such a welding system 62 may also include appropriate computer code programmed into the software to support the material sensing and control system 60. However, in other embodiments, the material sensing and control system 60 may be provided as a retrofit kit that may enable existing welding systems 62 with the material sensing and control capabilities described herein. The retrofit kit may include, for example, the material sensing and control system 60, having the processor 64 and the memory 68, as well as the sensor 38 from which the material sensing and control system 60 receives sensor input. In some embodiments, the retrofit kit may also include the wire feeder 20 having the sensor 38 installed thereon. To that end, such retrofit kits may be configured as add-ons that may be installed onto existing welding systems 62, providing material sensing and control capabilities. Further, as the retrofit kits may be installed on existing welding systems 62, they may also be configured to be removable once installed. Additionally, both the integrated and the retrofit systems may be configured for wired or wireless communication between the material sensing unit and one or more controllers of the welding system 62.

Figure 3:
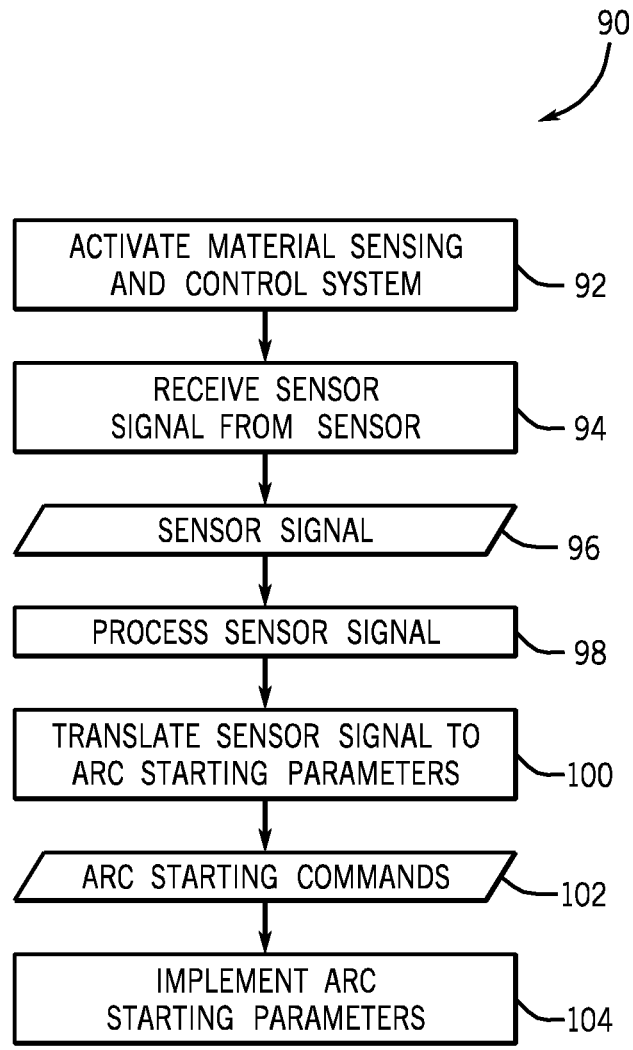
FIG. 3 is a process flow diagram of an embodiment of a method for automatically implementing arc starting parameters.

FIG. 3 is a process flow diagram of an embodiment of a method 90 for automatically implementing arc starting parameters. This method 90 may also be applied to automatically implementing other welding parameters as well. The method 90 includes activating (block 92) the material sensing and control system 60 and receiving (block 94) one or more sensor signals from the sensor 38 relating to the size of the welding wire 24 used. Activating (block 92) the material sensing and control system 60 may include turning on the entire welding system 62. In certain embodiments, activating (block 92) the material sensing and control system 60 may occur when a new drive roll (e.g., 42) is inserted into the wire feeder 20, signifying that the welding wire 24 is being changed. Such embodiments may include sensing when a portion of the wire feeder 20 is opened or closed, removed or inserted, such actions being necessary for changing the welding wire 24. For example, in certain embodiments, a button or switch disposed inside the wire feeder 20 may be depressed when a new spool 30 or drive roll 42 is inserted into the wire feeder 20.

Next, a sensor signal (block 96) is outputted from the sensor 38, acting as an input to the material sensing and control system 60. The sensor signal (block 96) may include a variety of signal types, such as image data, voltage, frequency, and so forth. The sensor signal (block 96) is then processed (block 98) by the material sensing and control system 60. This may include converting the raw sensor signal into computer usable data compatible with the material sensing and control system 60. For example, the material sensing and control system 60 may store a predetermined list of possible sensor signal values and the set of arc starting and/or welding parameters that correspond to each sensor signal. The material sensing and control system 60 further translates (block 100) the sensor signal into a set of arc starting and/or welding parameters by matching the received sensor signal to one of the predetermined sensor signals, and thus the correct parameters. In certain embodiments, the predetermined sensor signals may be organized as discrete values or be divided into ranges. As such, the received sensor signal may also be discrete and match a predetermined sensor signal exactly, or it may be an analog value that falls into one of the predetermined sensor signal ranges.

As the sensor signal is matched to the correct arc starting parameters, a set of arc starting commands (block 102) is outputted. For example, if a sensor signal having a voltage within a first range is received, a first arc starting or operational command may be produced, and if a sensor signal having a voltage within a second range is received, a second arc starting or operational command may be produced. The arc starting command (block 102) may then be the input used to implement (block 104) the appropriate arc starting or welding parameters for the welding system 62. According to the presently disclosed method 90, the correct arc starting or welding parameters are automatically implemented according to the size (or other property) of the welding wire 24 used, without the need for operator intervention.

As mentioned above, the sensor 38 is designed to output a signal indicative of a size of the welding wire 24 being fed through the wire feeder 20. In certain embodiments, this may involve the identification of one or more of the drive rolls 42 and 44 used to convey the welding wire 24 through the wire feeder 20. Again, in the present disclosure, the term wire feeder 20 extends to any device that uses drive rolls 42 and 44 to move the welding wire 24 through the welding system 10, including a wire feeder external to or integral with the power supply 16, or a spool gun (e.g., a torch 26 having its own wire feed drive rolls and associated sensor 38). In order to facilitate drive roll identification, the wire feeder 20 may include drive rolls 42 and 44 specially designed for identification purposes. As examples, FIGS. 4-8 provide views of different types of the drive roll 42 that may be used to determine the size and/or type of the welding wire 24.

Figure 4:
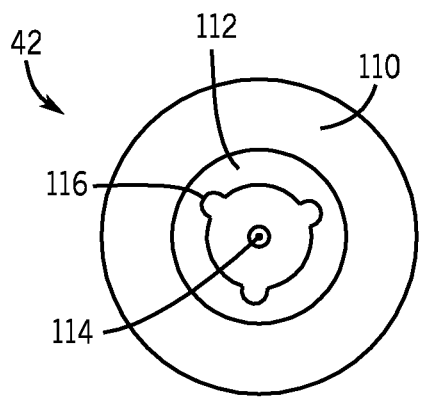
FIG. 4 is a front view of an embodiment of a drive roll that may be identified by a sensor to determine a size of welding wire.

FIG. 4 is a front view of an embodiment of the drive roll 42 that may be identified by the sensor 38 to determine a size of the welding wire 24. More specifically, the sensor 38 may generate a signal indicative of the size of the welding wire 24 by sensing a property specific to the particular drive roll 42 used to convey the welding wire 24 of a certain size. In the illustrated embodiment, the drive roll 42 includes an outer surface 110 and a counterbored section 112. The outer surface 110 extends farther than the counterbored section 112 in a direction along a rotational axis 114 of the drive roll 42. The drive roll 42 may be received onto a shaft of the wire drive assembly 32. Protrusions from the shaft (or other component of the wire drive assembly 32) may engage with one or more features 116 formed in the drive roll 42 to facilitate rotation of the drive roll 42 as the shaft rotates. As previously mentioned, the wire feeder 20 may includes the sensor 38 for determining a size of the welding wire 24 fed through the wire feeder 20 by identifying the drive roll 42. In certain embodiments, the sensor 38 may be configured to generate a signal related to welding wire size by sensing a dimension of the counterbored section 112 of the drive roll 42. This dimension may include, for example a distance between the counterbored section 112 and the outer surface 110, as described in detail below. The dimension may be different for different types of drive rolls 42, or for opposite ends of the same drive roll 42, as shown in FIGS. 5-8. In the wire feeder 20, the drive roll 42 may be interchangeable with these different drive rolls 42 in order to feed welding wire of different sizes and types of material. Each of the drive rolls 42 may be specially designed so that the sensor 38 is able to output a distinguishable signal based on each sensed property or dimension of the drive roll 42.

Figure 5:
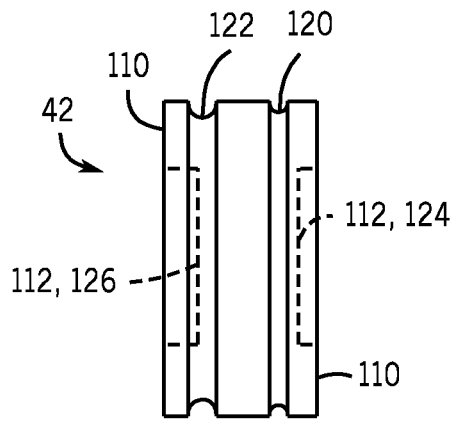
FIG. 5 is a side view of an embodiment of the drive roll of FIG. 4, including grooves for conveying aluminum welding wire of different sizes.
Figure 6:
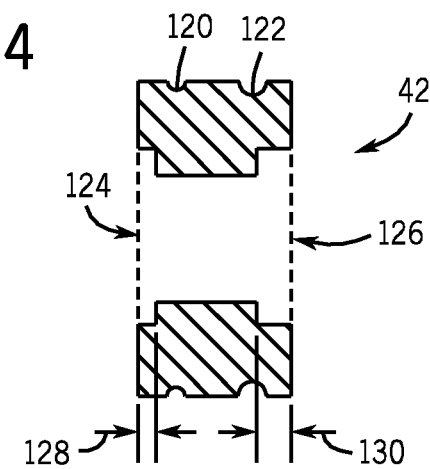
FIG. 6 is a cross sectional side view of an embodiment of the drive roll of FIG. 5.

FIG. 5 is a side view of an embodiment of the drive roll 42 of FIG. 4. The drive roll 42 includes two grooves 120 and 122, one on each side of the drive roll 42, so that the same drive roll 42 may be used with more than one type and/or size of welding wire 24. For example, when the drive roll 42 is used to convey relatively smaller diameter wire, the drive roll 42 may be positioned on a shaft of the wire drive assembly 32 such that the smaller groove 120 aligns with the welding wire 24. Likewise, when the same drive roll 42 is used with larger welding wire, the drive roll 42 may be positioned on the shaft in an opposite orientation so that the larger groove 122 aligns with the welding wire 24. The grooves in the illustrated drive roll 42 have a generally rounded shape, which may be appropriate for conveying aluminum welding wire, which is softer than other types (e.g., steel) of welding wire.

Certain embodiments may allow for the determination of the size of the welding wire 24 used based on a sensed dimension of the counterbored section 112. For each of the grooves 120 and 122 in the drive roll 42, the corresponding counterbored sections 124 and 126 extend different depths into the drive roll 42. The depth of the counterbored sections 112 may be determined by the sensor 38 in order to output a signal indicative of the corresponding welding wire size. This is shown more clearly in FIG. 6, which is a cross sectional view of an embodiment of the drive roll 42 of FIG. 5. The counterbored section 124 extends into the drive roll 42 a distance 128 on one side, and the counterbored section 126 extends into the drive roll 42 a distance 130 on the other side. The sensor 38, upon sensing either the distance 128 or the distance 130 (depending on the orientation of the drive roll 42), may output a signal indicative of the size of the welding wire 24 that fits in the groove 120 or the groove 122, respectively.

The sensor 38 and the material sensing and control system 60 may be configured to implement appropriate parameters based on a signal generated upon sensing a depth of the counterbored section 112 of the drive roll 42. Each of the different counterbored sections 112 (e.g., 124 and 126) may be formed in the drive roll 42 to a different depth for each different welding wire size. For example, the relatively shorter distance 128 may be 1/16 inch, and may correspond to a welding wire diameter of approximately 0.035 inches. The relatively greater distance 130 may be 1/8 inch, and may correspond to a welding wire diameter of approximately 0.045 inches. Other drive rolls 42 may include a counterbored section 112 extending to different depths (e.g., 3/16 inch) for different welding wire diameters (e.g., 0.052 inch).

Figure 7:
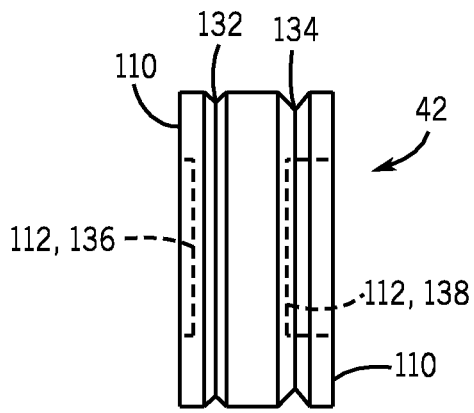
FIG. 7 is a side view of an embodiment of the drive roll of FIG. 4, including grooves for conveying steel wire of different sizes.
Figure 8:
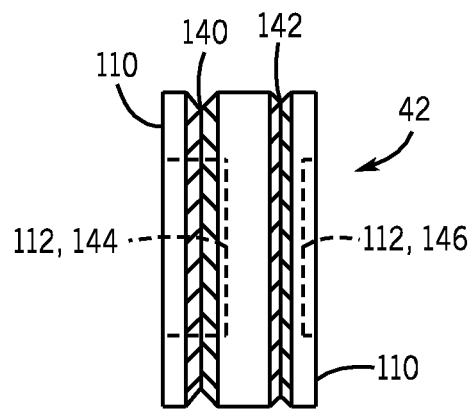
FIG. 8 is a side view of an embodiment of the drive roll of FIG. 4, including grooves for conveying flux cored wire of different sizes.

Some embodiments of the drive roll 42 may be used with different types of the welding wire 24. For example, the drive rolls 42 of FIGS. 5 and 6 include the rounded grooves 120 and 122 for conveying aluminum welding wire. FIG. 7 is an embodiment of the drive roll 42 of FIG. 4 designed to convey steel welding wire through grooves 132 and 134. The grooves 132 and 134 are angled, not rounded like the grooves 120 and 122, because steel welding wire is harder than aluminum welding wire. The grooves 132 and 134, which are used to convey different sizes of the steel welding wire, may correspond with different depths of counterbored sections 136 and 138, respectively. FIG. 8 is an embodiment of the drive roll 42 of FIG. 4 designed to convey flux cored welding wire through grooves 140 and 142. The grooves 140 and 142 are generally angled and slotted to hold the flux cored welding wire in place through the wire feeder 20. The grooves 140 and 142, which are used to convey different sizes of the flux cored welding wire, may correspond with different depths of counterbored sections 144 and 146, respectively.

In some embodiments, the drive roll 42 may include different depths of the counterbored section 112 corresponding to the different types (material) of the welding wire 24 in addition to the different sizes of the welding wire 24. That is, the counterbored sections 124, 126, 136, 138, 144, 146 of the drive rolls 42 may be different for different materials (e.g., aluminum, steel, flux cored) of the welding wire 24, even if the different materials of welding wire 24 have the same diameter. In this way, there may be a different depth of the counterbored section 112 for drive rolls 42 used with any combination of size and material of the welding wire 24.

It should be noted that the sensor 38 in the wire feeder 20 may output a signal to the material sensing and control system 60 based on a measurement of any parameter indicative of welding wire size. Although the illustrated embodiments are focused on sensing a dimension of the drive roll 42 used to convey the welding wire 24, other parameters may be sensed. For example, the drive roll 42 may include a magnet to generate a magnetic field that is detected by the sensor 38. In other embodiments, the sensor 38 may directly detect the diameter of the welding wire 24, instead of detecting a feature of the drive roll 42. In addition, the wire feeder 20 may include multiple sensors 38 configured to sense multiple parameters of the welding wire 24 and/or the drive roll 42. These multiple sensed parameters may function as inputs used in combination to control the welding system 62. For example, one of the sensors 38 may detect a magnetic field produced by a magnet in the drive roll 42, while another of the sensors 38 may include an optical sensor to detect a depth of the counterbored section 112. A signal produced by the magnetic sensor may correspond with a type of the welding wire 24 to be conveyed by the drive roll 42, while a signal produced by the optical sensor may correspond with a size of the welding wire 24. Other combinations of multiple sensors 38, sensed parameters, and corresponding control outputs may be possible as well. Although the counterbored sections 112 are shown to be formed in an inner portion of the drive roll 42 relative to the rotational axis 114, such counterbored sections 112 may be formed in an annular portion of the drive roll 42 or an outer portion of the drive roll 42.

Figure 9:
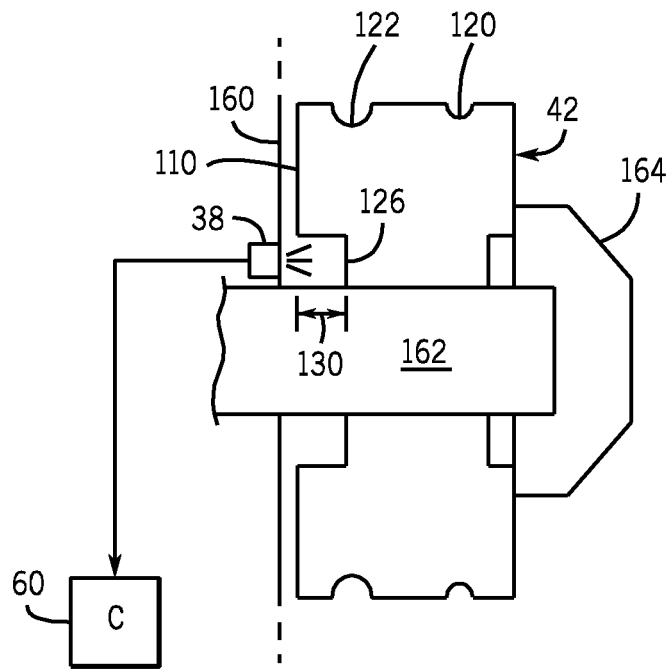
FIG. 9 is a cross sectional side view of an embodiment of components of the wire feeder of FIG. 1.

For embodiments where the sensor 38 generates a signal based on an identification of the drive roll 42, the sensor 38 may be located in different places throughout the wire drive assembly 32. FIG. 9 shows components of the wire drive assembly 32, including the sensor 38 located adjacent to the drive roll 42. More specifically, the sensor 38 is located in a wire drive assembly housing 160 opposite a surface of the counterbored section 126 of the drive roll 42 of FIGS. 5 and 6. As illustrated, the drive roll 42 may be received onto a shaft 162 that extends from the wire drive assembly housing 160. The wire drive assembly housing 160 may house a motor that turns the shaft 162, causing the drive roll 42 to rotate along with the shaft 162. In the illustrated embodiment, an attachment mechanism 164 secures the drive roll 42 to the shaft 162 so that the drive roll 42 rotates with the shaft 162. However, in other embodiments, the shaft 162 may include one or more features configured to engage with and urge rotation of the drive roll 42.

Regardless of how the drive roll 42 is attached to the shaft 162, the sensor 38 may be located in the wire drive assembly housing 160 to sense a parameter indicative of the size of the welding wire 24, based on drive roll identification. The sensor 38 may include an optical sensor that determines the distance 130 between the outer surface 110 and the counterbored section 126 of the drive roll 42. The optical sensor may measure a reflection of an emitted light or infrared signal sent toward the drive roll 42. In other embodiments, the sensor 38 may include a mechanical sensor or a magnetic sensor. The sensor 38 may communicate a signal indicative of the measured parameter (which corresponds to a welding wire size) to the material sensing and control system 60 for processing. As discussed at length above, the material sensing and control system 60 may include the control circuitry 28 in the wire feeder 20, the control circuitry 29 in the power supply 16, or a combination thereof.

Figure 10:
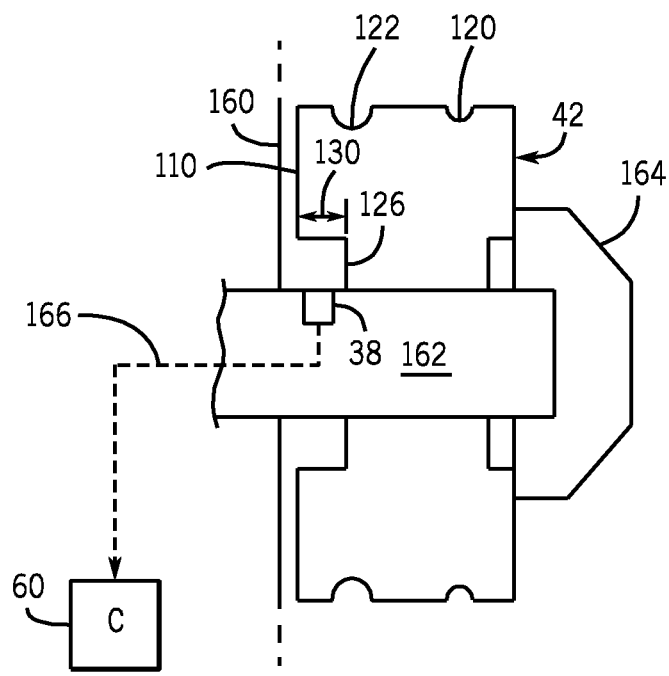
FIG. 10 is a cross sectional side view of an embodiment of components of the wire feeder of FIG. 1.

FIG. 10 is another embodiment of components of the wire feeder 20, including the sensor 38 used to generate a signal indicative of the drive roll 42 and thus, the welding wire size. In this embodiment, the sensor 38 is located in the shaft 162 that rotates the drive roll 42. The sensor 38 may, again, be an optical sensor. In this location at the edge of the shaft 162, the sensor 38 may approximately sense the distance 130 from the outer surface 110 to the counterbored section 126 of the drive roll 42. In some instances (e.g., when the other side of the drive roll 42 is facing the wire drive assembly housing 160), the sensor 38 may detect the drive roll 42 covering a portion of the sensor 38 and generate a different signal as a result. In other embodiments, the sensor 38 may be configured to sense a diameter of the counterbored section 112. As illustrated, the sensor 38 may communicate wirelessly (wireless signal 166) with the material sensing and control system 60. This may be desirable for communicating the signal indicative of welding wire size from the sensor 38 positioned on the rotatable shaft 162, instead of routing the electrical signal through a center of the shaft 162.

Multiple sensors 38 may be present in the same wire feeder 20 to sense multiple parameters of the drive roll 42, and the material sensing and control system 60 may process signals indicative of these parameters in combination. For example, the sensors 38 of FIGS. 9 and 10 may be used in combination to provide measurements of different parameters of the drive roll 42. More specifically, the sensor 38 positioned in the wire drive assembly housing 160 may detect the distance 130 of the counterbored section 112. The sensor 38 located in the shaft 162 may detect the diameter of the counterbored section 112. The two detected properties (e.g., distance 130 and diameter) may be used in conjunction to determine the size of the welding wire 24 conveyed by the drive roll 42. In some embodiments, one of the detected properties may be indicative of the size of the welding wire 24, while the other is indicative of the material of the welding wire 24, or some other property of the welding wire 24.

As previously noted, the sensor 38 may send the signal indicative of welding wire size whenever the drive roll 42 has been changed. For example, the sensor 38 may detect a change in the drive roll 42 when the drive roll 42 is removed from the shaft 162. Once another drive roll 42 is placed on the shaft 162, the sensor 38 may detect the new drive roll 42 in position along the shaft 162 and, in response, send a signal to the material sensing and control system 60. In some embodiments, another sensor in communication with the control circuitry 28 may detect the insertion and/or removal of the drive roll 42 and signal the control circuitry 28. In response, the control circuitry 28 may then request that the sensor 38 provide the signal relating to drive roll identification and, consequently, welding wire size. In some embodiments, a separate sensor may signal the control circuitry when the spool 30 is removed from the wire feeder 20, signaling that a type and/or size of welding wire 24 may be used. In still other embodiments, a switch located in the wire feeder 20 may be depressed when the drive roll 42 and/or the spool 30 is inserted, and trigger the control circuitry 28.

Other combinations of sensors 38, sensor placements, and drive rolls 42 may be used to identify the drive rolls 42 corresponding to a particular size and/or material of the welding wire 24. For example, as discussed above, the sensor 38 may in some embodiments include an electromagnetic sensor configured to detect a magnetic field of the drive roll 42. The magnetic field may result from magnets located within the drive roll 42. In embodiments where the drive roll 42 includes a counterbored section along an outside edge of the drive roll 42, the sensor 38 may be located accordingly within the wire drive assembly housing 160.

The disclosed embodiments may allow for automatically adjusting arc starting parameters and/or welding parameters based on a sensor signal indicating a size of the welding wire 24. In addition, the sensor signal may represent an identification of the drive roll 42 used to convey the welding wire 24. The material sensing and control system 60 is able to make automatic adjustments to operating parameters of the power supply 16 and/or the wire feeder 20 based on the received sensor signal. This may allow more user friendly operation of the welding system 10, as the system can automatically optimize or correct for operator errors in setting arc starting parameters or other welding parameters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a welding wire feeder comprising a drive roll configured to feed a welding wire;
a power supply coupled to the welding wire feeder and configured to produce a welding arc; and
a sensor configured to sense a first parameter indicative of a size of the welding wire fed through the welding wire feeder, wherein the sensor is configured to send a signal to the power supply, the signal representing the first parameter indicative of the size of the welding wire, wherein the power supply is configured to automatically implement at least one of an arc starting parameter or a welding parameter based on the signal, and the first parameter comprises a dimension of a counterbored section of the drive roll, a magnetic field of the drive roll, or any combination thereof.

2. The welding system of claim 1, wherein the sensor is disposed in the welding wire feeder.

3. The welding system of claim 1, wherein the sensor is configured to sense a second parameter indicative of the material of the welding wire by identifying the dimension of the counterbored section of the drive roll.

4. The welding system of claim 1, wherein the sensor comprises an optical sensor, and the dimension of the counterbored section comprises a diameter or a depth of the counterbored section of the drive roll.

5. The welding system of claim 1, wherein the sensor is configured to send the signal whenever the drive roll has been changed.

6. The welding system of claim 1, wherein the power supply comprises computer readable code configured to receive the signal as an input, and output executable instructions for implementing an appropriate arc starting parameter, welding parameter, or both, in the power supply.

7. The welding system of claim 1, wherein the power supply comprises computer readable code configured to determine the appropriate arc starting parameter, welding parameter, or both, by comparing the signal with a predetermined set of possible signals stored in a memory of the power supply.

8. A welding system, comprising:
a welding wire feeder comprising a sensor configured to sense a first parameter indicative of a size of a welding wire fed through the welding wire feeder and to output a signal representative of the sensed first parameter, and the first parameter comprises a dimension of a counterbored section of a drive roll of the welding wire feeder; and
a controller configured to receive the signal from the sensor, to convert the signal into a corresponding set of parameters, and to implement the parameters.

9. The welding system of claim 8, wherein the welding wire feeder comprises the drive roll that is interchangeable with other drive rolls, and the sensor is configured to sense the first parameter indicative of the size of the welding wire by identifying the drive roll used in the welding wire feeder.

10. The welding system of claim 8, wherein the parameters comprise arc starting parameters, welding parameters, or both.

11. The welding system of claim 9, wherein the sensor is disposed on a shaft configured to receive the drive roll.

12. The welding system of claim 8, wherein the sensor is configured to sense a second parameter indicative of a type of the welding wire fed through the welding wire feeder, wherein the second parameter comprises a diameter of the counterbored section of the drive roll, a depth of the counterbored section of the drive roll, or any combination thereof.

13. The welding system of claim 8, wherein the sensor is configured to wirelessly communicate the signal to the controller.

14. The welding system of claim 8, wherein the controller comprises a memory that stores a predetermined set of possible signal values and the parameters to be implemented in response to each of the possible signal values.

15. The welding system of claim 8, wherein the controller is disposed in a power supply of the welding system.

16. A method, comprising:
determining a first sensor signal using a first sensor associated with a welding wire feeder, wherein the first sensor signal is based at least in part on a dimension of a counterbored section of a drive roll in the welding wire feeder, and the first sensor signal is indicative of a size of a welding wire used by the welding wire feeder;
communicating the first sensor signal from the first sensor to a controller disposed within a power supply;
processing the first sensor signal by translating the first sensor signal into a corresponding set of arc starting parameters, welding parameters, or both; and
implementing the corresponding set of arc starting parameters or welding parameters in the power supply, wherein the power supply is configured to produce an arc with the corresponding set of arc starting parameters, welding parameters, or both.

17. The method of claim 16, wherein the first sensor comprises an optical sensor, a mechanical sensor, or any combination thereof.

18. The method of claim 16, comprising detecting that the welding wire has been changed in the welding wire feeder.

19. The method of claim 16, wherein the first sensor signal is indicative of a type of the welding wire used by the welding wire feeder.

20. The method of claim 16, comprising:
- determining a second sensor signal associated with a welding wire feeder, wherein the second sensor signal is based at least in part on a magnetic field of the drive roll, and the sensor second signal is indicative of the size of the welding wire, a type of the welding wire, or a material of the welding wire, or any combination thereof;
- communicating the second sensor signal from a second sensor to the controller disposed within the power supply; and
- adjusting the corresponding set of arc starting parameters, welding parameters, or both, based at least in part on the second sensor signal.

* * * * *